US009913253B2

(12) United States Patent
Hareuveni et al.

(10) Patent No.: US 9,913,253 B2
(45) Date of Patent: Mar. 6, 2018

(54) APPARATUS, SYSTEM AND METHOD OF SELECTING A WIRELESS COMMUNICATION CHANNEL

(71) Applicant: INTEL IP CORPORATION, Santa Clara, CA (US)

(72) Inventors: Ofer Hareuveni, Haifa (IL); Noam Ginsburg, Haifa (IL); Oz Shalev, Hogla (IL); Rony Ross, Haifa (IL)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/122,317

(22) PCT Filed: Mar. 27, 2014

(86) PCT No.: PCT/US2014/032063
§ 371 (c)(1),
(2) Date: Aug. 29, 2016

(87) PCT Pub. No.: WO2015/147839
PCT Pub. Date: Oct. 1, 2015

(65) Prior Publication Data
US 2016/0374053 A1 Dec. 22, 2016

(51) Int. Cl.
*H04W 72/02* (2009.01)
*H04W 60/00* (2009.01)
(Continued)

(52) U.S. Cl.
CPC ......... *H04W 72/02* (2013.01); *H04W 60/005* (2013.01); *H04W 72/085* (2013.01); *H04W 36/14* (2013.01)

(58) Field of Classification Search
CPC .......................... H04W 4/003; H04W 72/085; H04L 63/1408; H04L 1/20
See application file for complete search history.

(56) References Cited

U.S. PATENT DOCUMENTS 6,223,031 B1 * 4/2001 Naslund ................ H04W 16/04
455/423
6,516,192 B1 * 2/2003 Spaur .................. H04W 72/042
455/450
(Continued)

FOREIGN PATENT DOCUMENTS

| JP | 2001507895 | 6/2001 |
| JP | 2007037145 | 2/2007 |
| JP | 2013157941 | 8/2013 |

OTHER PUBLICATIONS

International Preliminary Report on Patentability for PCT/US2014/032063, dated Oct. 6, 2016, 9 pages.
(Continued)

*Primary Examiner* — Dung Hong
(74) *Attorney, Agent, or Firm* — Shichrur & Co.

(57) ABSTRACT

Some demonstrative embodiments include apparatuses, systems and/or methods of selecting a wireless communication channel to communicate in a wireless communication network. For example, a wireless communication device may include a channel selector to determine a plurality of channel grades of a respective plurality of potential wireless communication channels, the channel selector to determine a channel grade of the plurality of channel grades according to a weighted function of a plurality of channel assessment parameters corresponding to a potential wireless communication channel of the plurality of potential wireless communication channels, wherein the channel selector is to select, based on the plurality of channel grades, a selected wireless communication channel from the plurality of potential wireless communication channels; and a radio to communicate over the selected wireless communication channel.

25 Claims, 3 Drawing Sheets

(51) Int. Cl.
*H04W 72/08* (2009.01)
*H04W 36/14* (2009.01)

(56) References Cited

U.S. PATENT DOCUMENTS

| | | |
|---|---|---|
| 2005/0227624 A1 | 10/2005 | Hiddink et al. |
| 2006/0013245 A1* | 1/2006 | Abedi ............... H04L 47/14 370/433 |
| 2007/0025310 A1* | 2/2007 | Weng ............... H04W 72/085 370/338 |
| 2008/0198801 A1 | 8/2008 | Kesselman et al. |
| 2009/0067447 A1* | 3/2009 | Giaimo ............... H04W 72/02 370/431 |
| 2010/0069013 A1* | 3/2010 | Chaudhri ............ H04W 16/14 455/67.11 |
| 2012/0166671 A1 | 6/2012 | Qi et al. |
| 2012/0276944 A1* | 11/2012 | Liao ............... H04L 5/0023 455/524 |
| 2015/0139203 A1* | 5/2015 | Miryala ............ H04W 28/0263 370/338 |
| 2015/0208355 A1* | 7/2015 | Emmanuel ......... H04W 52/0258 370/311 |

OTHER PUBLICATIONS

International Search Report and Written Opinion for PCT/US2014/032063, dated Dec. 15, 2014, 10 pages.
IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
Wi-Fi Alliance Technical Committee P2P Task Group; Wi-Fi Peer-to-Peer (P2P) Technical Specification; Version 1.2; Dec. 14, 2011, 160 pages.
Office Action for Taiwanese Patent Application No. 104103901 dated Mar. 16, 2016, 8 pages (Including 1 page of English translation).
Office Action for Japanese Patent Application No. 2016-570761, dated Oct. 3, 2017, 13 pages (Including 7 pages of English translation).

* cited by examiner

APPARATUS, SYSTEM AND METHOD OF SELECTING A WIRELESS COMMUNICATION CHANNEL

TECHNICAL FIELD

Some demonstrative embodiments relate to an apparatus, system and method of selecting a wireless communication channel.

BACKGROUND

A wireless communication device, for example, a Wireless Fidelity (Wi-Fi) device, may cycle through multiple channels for implementing multiple connection scenarios.

For example, the wireless communication device may maintain connectivity to a first wireless communication network on a first wireless communication channel. In one example, the wireless communication device may maintain Internet connectivity by connection, e.g., a Basic Service Set (BSS) connection, to an Access Point (AP) over the first wireless communication channel. In another example, the wireless communication device may be required to maintain access, e.g., connectivity, presence, discoverability and/or time synchronization, to one or more predefined social channels, e.g., periodically. The first channel may be selected and/or set by a network entity other than the wireless communication device, e.g., by the AP, or may be predefined, e.g., by an industry standard and/or regulations.

The wireless communication device may also maintain connectivity with a second wireless network on a second wireless communication channel. The second channel may be set and/or selected by the wireless communication device. For example, the wireless communication device may host a Personal Area Network (PAN) or a Peer To Peer (P2) network, and/or may provide a Tethering service over the second wireless communication channel. For example, the wireless communication device may act as Wi-Fi P2P Group Owner (GO) over the second wireless communication channel, may act as a Mobile Access Point (AP) over the second wireless communication channel, may maintain a direct connection with a peer device, e.g., a Tunneled Direct Link Set-up (TDLS) connection, over the second wireless communication channel, and/or may publish, search and/or obtain services from neighbor devices over the second wireless communication channel.

In order to maintain concurrent connectivity with the first and second networks, the wireless communication device may be required to switch between the first and second wireless communication channels.

Performing a large number of switches between wireless communication channels may increase latency and/or overhead.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
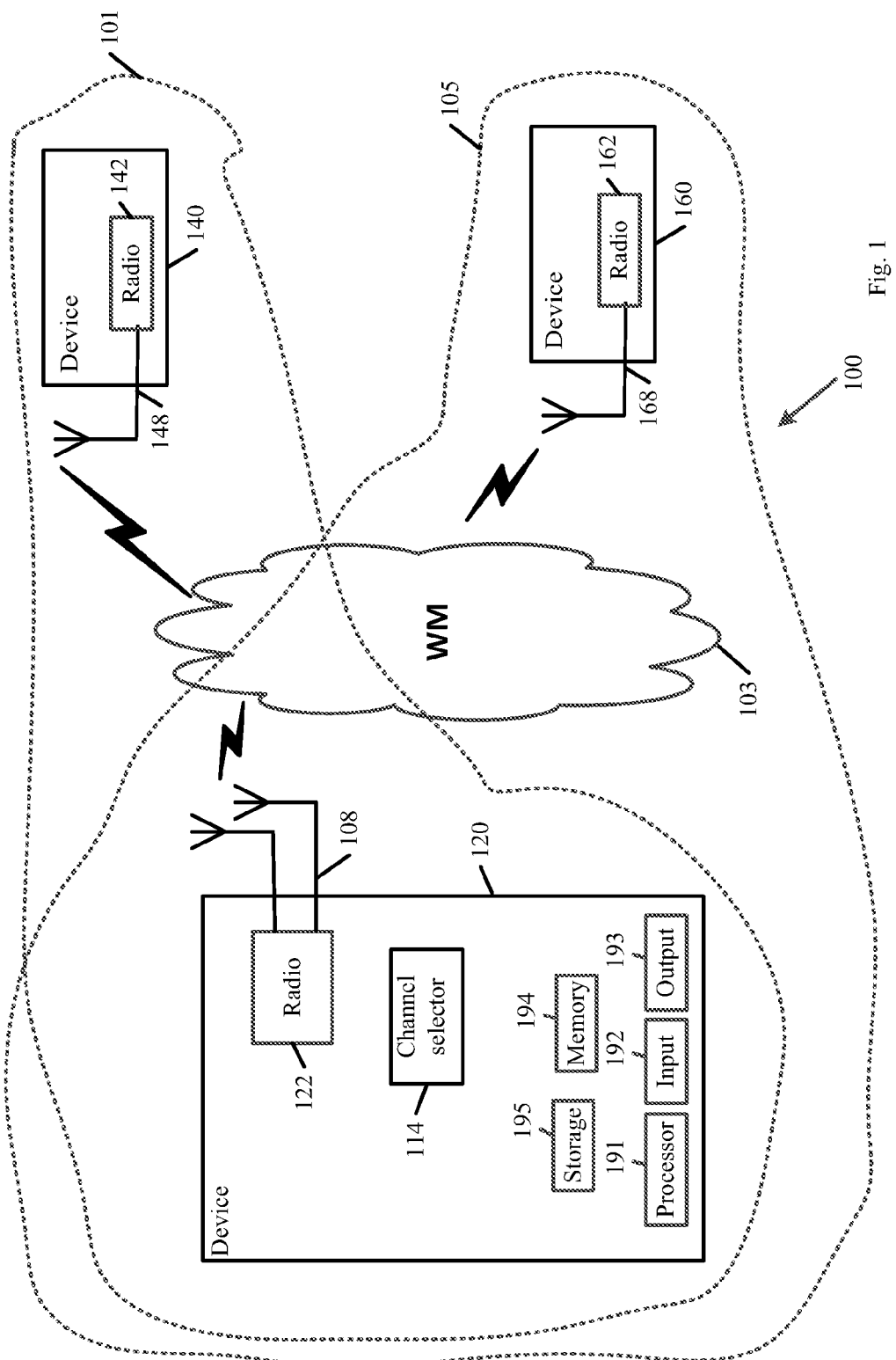
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, an Ultrabook™ computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version 1.1, April* 2011, *Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part* 11: *Wireless LAN Medium Access Control* (*MAC*) *and Physical Layer* (*PHY*) *Specifications, Mar.* 29, 2012; *IEEE*802.11 *task group ac* (*TGac*) (*"IEEE*802.11-09/0308r12—*TGac Channel Model Addendum Document"*); *IEEE* 802.11 *task group ad* (*TGad*) (*IEEE P*802.11*ad*-2012, *IEEE Standard for Information Technology—Telecommunications and Information Exchange Between Systems—Local and Metropolitan Area Networks—Specific Requirements—Part* 11: *Wireless LAN Medium Access Control* (*MAC*) *and Physical Layer* (*PHY*) *Specifications—Amendment* 3: *Enhancements for Very High Throughput in the* 60 *GHz Band,* 28 *Dec.* 2012); *IEEE* 802.11*z* (*IEEE* 802.11*z*-2010, *IEEE Standard for Information technology—Local and metropolitan area networks—Specific requirements—Part* 11: *Wireless LAN Medium Access Control* (*MAC*) *and Physical Layer* (*PHY*) *specifications Amendment* 7: *Extensions to Direct-Link Setup* (*DLS*), *Oct.* 18, 2010)) and/or future versions and/or derivatives thereof, devices and/or networks operating in accordance with existing and/or Wireless Fidelity (WiFi) Alliance (WFA) Peer-to-Peer (P2P) specifications (*WiFi P2P technical specification, version* 1.2, 2012) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Frame Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The phrase "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with suitable limited-range or short-range wireless communication networks, for example, a wireless area network, a WPAN, a Peer to Peer (P2P) network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 GHz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

The phrase "Peer-to-peer" (P2P) network, as used herein, may relate to a network in which a STA in the network can operate as a client or as a server for another STA in the network. The P2P network may allow shared access to resources, e.g., without a need for a central server.

The phrase "P2P device", as used herein, may relate to a WFA P2P device that may be capable of acting as both a P2P Group Owner and a P2P Client.

The phrase "P2P Client", as used herein, may relate to a P2P device that may be connected to a P2P Group Owner.

The phrase "P2P Group owner (GO)", as used herein, may relate to an "AP-like" entity, or to a Personal Basic Service Set (PBSS) Control Point (PCP), which may provide and use connectivity between clients.

The phrase "P2P Group", as used herein, may relate to a set of devices including one P2P Group Owner and zero or more P2P Clients.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices, e.g., including wireless communication devices 120, 140 and/or 160, capable of communicating content, data, information and/or signals over a wireless communication medium 103, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, wireless communication devices 120, 140 and/or 160 may include, for example, a PC, a desktop computer, a mobile computer, a laptop computer, an Ultrabook™ computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a wireless display, a wireless storage, a music player, or the like.

In some demonstrative embodiments, wireless communication devices 120, 140 and/or 160 may include radios to perform wireless communication between wireless communication devices 120, 140, and/or 160 and/or with one or more other wireless communication devices. For example, wireless communication device 120 may include at least one radio 122, wireless communication device 140 may include at least one radio 142, and/or wireless communication device 160 may include at least one radio 162. For example, radios 122, 142 and/or 162 may include or may be implemented as part of a wireless Network Interface (NI), e.g., a wireless NI Card (NIC), and the like.

In some demonstrative embodiments, radios 122, 142 and/or 162 may include one or more wireless transmitters, receivers and/or transceivers able to send and/or receive wireless communication signals, RF signals, frames, blocks, transmission streams, frames, messages, data items, and/or data. In one example, radios 122, 142 and/or 162 may include modulation elements, demodulation elements, amplifiers, analog to digital and digital to analog converters, filters, and/or the like.

In some demonstrative embodiments, radios 122, 142 and/or 162 may include, or may be associated with, one or more antennas. For example, radio 122 may be associated with one or more antennas 108, radio 142 may be associated with one or more antennas 148 and/or radio 162 may be associated with one or more antennas 168.

Antennas 108, 148 and/or 168 may include any type of antennas suitable for transmitting and/or receiving wireless communication signals, blocks, frames, transmission streams, frames, messages and/or data. For example, antennas 108, 148 and/or 168 may include any suitable configuration, structure and/or arrangement of one or more antenna elements, components, units, assemblies and/or arrays. Antennas 108, 148 and/or 168 may include, for example, antennas suitable for directional communication, e.g., using beamforming techniques. For example, antennas 108, 148 and/or 168 may include a phased array antenna, a multiple element antenna, a set of switched beam antennas, and/or the like. In some embodiments, antennas 108, 148 and/or 168 may implement transmit and receive functionalities using separate transmit and receive antenna elements. In some embodiments, antennas 108, 148 and/or 168 may implement transmit and receive functionalities using common and/or integrated transmit/receive elements.

In some demonstrative embodiments, wireless communication devices 120, 140, and/or 160 may also include, for example, a processor 191, an input unit 192, an output unit 193, a memory unit 194, and a storage unit 195. Wireless communication devices 120, 140 and/or 160 may optionally include other suitable hardware components and/or software components. In some demonstrative embodiments, some or all of the components of wireless communication devices 120, 140, and/or 160 may be enclosed in a common housing or packaging, and may be interconnected or operably associated using one or more wired or wireless links. In other embodiments, components of wireless communication devices 120, 140, and/or 160 may be distributed among multiple or separate devices.

Processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. For example, processor 191 executes instructions, for example, of an Operating System (OS) of device 120 and/or of one or more suitable applications.

Memory unit 194 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 may include, for example, a hard disk drive, a floppy disk drive, a Compact Disk (CD) drive, a CD-ROM drive, a DVD drive, or other suitable removable or non-removable storage units. For example, memory unit 194 and/or storage unit 195, for example, may store data processed by device 120.

Input unit 192 may include, for example, a keyboard, a keypad, a mouse, a touch-screen, a touch-pad, a track-ball, a stylus, a microphone, or other suitable pointing device or input device. Output unit 193 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, wireless communication device 120 may maintain accessibility to and/or connectivity with a plurality of wireless communication networks, e.g., including at least one wireless communication network 101, and at least one wireless communication network 105.

In some demonstrative embodiments, wireless communication network 101 and/or wireless communication network 105 may include, for example, a WiFi communication network.

In some demonstrative embodiments, wireless communication devices 120 and 140 may form, or may be part of, wireless communication network 101.

In some demonstrative embodiments, wireless communication network 101 may include an AP and one or more STAs. For example, device 140 may perform the functionality of the AP, and/or device 120 may perform the functionality of a STA.

In one example, device 140 may form wireless communication network 101 over WM 103, for example, to enable access of one or more wireless communication devices, e.g., wireless communication device 120, to one or more network resources, e.g., the Internet, a network device or service, e.g., a printer, a file server, and/or the like.

In another example, device 120 may be required to maintain accessibility and/or connectivity over at least one predefined social channel of network 101, for example, to periodically monitor the social channel for communications, e.g., beacons and/or any other transmissions, of wireless communication network 101, to be discoverable over wireless communication network 101, to maintain time synchronization with wireless communication network 101, and/or to perform and/or enable any other functionality.

In some demonstrative embodiments, the second wireless communication network 105 may include a P2P network, a Personal Area Network (PAN), a WiFi Direct (WFD) network, an ad-hoc network, or any other network.

In some demonstrative embodiments, wireless communication devices 120 and 160 may form, or may be part of, wireless communication network 105, e.g., a P2P network or a PAN.

In some demonstrative embodiments, wireless communication network 105 may include one or more WiFi direct devices. For example, devices 120 and 160 may perform the functionality of WiFi direct devices.

In some demonstrative embodiments, wireless communication network 105 may include a network controller and one or more wireless communication devices, e.g., client devices. For example, device 120 may perform the functionality of the network controller, and/or device 160 may perform the functionality of a client device.

In some demonstrative embodiments, wireless communication network 105 may include a group owner (GO) and one or more P2P client devices. For example, device 120 may perform the functionality of the GO and/or device 160 may perform the functionality of a P2P client device.

In some demonstrative embodiments, wireless communication device 120 may perform the functionality of a tethering device, e.g., a soft AP or a Mobile AP, to provide a tethering service to one or more devices of wireless communication network 105, e.g., to wireless communication device 160.

In some demonstrative embodiments, wireless communication device 120 may maintain a direct link connection with wireless communication device 160, e.g., a Tunneled Direct Link Set-up (TDLS) connection, or any other connection or link.

In some demonstrative embodiments, wireless communication device 120 may perform any other functionality in wireless communication network 105, for example, to publish, search and/or obtain services from one or more neighbor wireless communication devices, e.g., wireless including communication device 160.

In one example, device 120 may include a Smartphone, device 140 may include a router, and/or device 160 may include a wireless display. According to this example, device 120 may communicate with device 140 via wireless communication network 101, for example, to access the Internet and/or any other network service and/or device. According to this example, device 120 may communicate with device 160 via a wireless P2P network, e.g., wireless communication network 105, for example, to enable displaying video from the Smartphone on the wireless display.

In some demonstrative embodiments, wireless communication network 101 may operate over a first wireless communication channel, which may be selected or set by wireless communication device 140, e.g., if wireless communication device 140 performs the functionality of an AP of network 101. For example, wireless communication device 140 may select an operational wireless communication channel to communicate with devices of wireless communication network 101. In one example, wireless communication device 140 may select the operational wireless communication channel from a plurality of predefined wireless communication channels. For example, wireless communication device 140 may select the operational wireless communication channel from a plurality of predefined WiFi communication channels, e.g., the WiFi channels 1, 6, 11 and 14 and/or any other channel.

In some demonstrative embodiments, wireless communication device 120 may set and/or select a second wireless communication channel to be used by wireless communication network 105. For example, wireless communication device 120 may include a channel selector 114 to select the wireless communication channel to be used by wireless communication network 105, e.g., as described below.

Some demonstrative embodiments are described herein with respect to a wireless communication device, e.g., device 120, capable of communicating over two networks, e.g., network 101 and network 105. In other embodiments, the wireless communication device may be capable of communicating over any other plurality of wireless communication networks.

In one example, wireless communication device 120 may communicate over network 101 using a channel selected by device 140, and wireless communication device 120 may communicate over N networks, wherein N>1, e.g., including network 105, using up to N channels, which may be selected by channel selector 114.

In another example, wireless communication device 120 may communicate over M networks, wherein M>1, e.g., including network 101, using up to M channels selected by an entity other than wireless communication device 120, and wireless communication device 120 may communicate over network 105 using a channel, which may be selected by channel selector 114.

In another example, wireless communication device 120 may communicate over M networks, e.g., including network 101, using up to M channels selected by an entity other than wireless communication device 120, and wireless communication device 120 may communicate over N networks, e.g., including network 105, using up to N channels, which may be selected by channel selector 114.

In some demonstrative embodiments, wireless communication device 120 may be required to switch radio 122 between the first and second wireless communication channels, e.g., if the first and second wireless communication channels include different and/or non-overlapping channels, for example, in order to maintain concurrent connectivity with wireless communication networks 101 and 105. However, performing a large number of switches between the first and second wireless communication channels may increase latency and/or overhead.

In some demonstrative embodiments, channel selector 114 may select to set the second wireless communication channel to overlap with the first wireless communication channel, e.g., to avoid switching between channels when switching between wireless communication networks 101 and 105. For example, remaining on the same channel when switching between wireless communication networks 101 and 105 may reduce overhead and/or latency.

However, in some scenarios and/or use cases, using a common channel for communicating over both networks 101 and 105 may be suboptimal and/or may result in degraded performance. For example, communications of networks 101 and 105 may interfere with one another, the common channel may not be able to support a capacity of both networks 101 and 105, and/or the communications of networks 101 and 105 may overload the common channel.

In some demonstrative embodiments, channel selector 114 may be configured to select the wireless communication channel to be used by wireless communication network 105, for example, when setting up or initializing wireless communication network 105.

In some demonstrative embodiments, channel selector 114 may be configured to select the wireless communication channel to be used by wireless communication network 105, for example, in order to switch wireless communication network from a first previously selected channel to a second channel.

In one example, channel selector 114 may select the wireless communication channel to be used by wireless communication network 105, for example, upon creation of a new virtual Media Access Control (MAC) client.

In another example, channel selector 114 may select the wireless communication channel to be used by wireless communication network 105, for example, upon termination of a connection of a virtual MAC client.

In another example, channel selector 114 may select the wireless communication channel to be used by wireless communication network 105, for example, upon reception of a channel switch announcement over an active network, e.g., wireless communication network 101.

In another example, channel selector 114 may select the wireless communication channel to be used by wireless communication network 105, for example, upon detection of a predefined activity over the previously selected channel, e.g., upon detection of radar activity over the previously selected channel.

In another example, channel selector 114 may select the wireless communication channel to be used by wireless communication network 105, for example, responsive to a change in a set of available channels ("the available channel list"), which may be used to communicate over wireless communication network 105. For example, the available channel list may change as a result of roaming between regulatory domains, for example, if wireless communication device 120 utilizes a Central Regulatory Domain Agent (CRDA) protocol of a Mobile Country Code (MCC).

In another example, channel selector 114 may select the wireless communication channel to be used by wireless communication network 105, for example, upon receipt of preemptive information on expected interference by other collocated wireless devices.

In another example, channel selector 114 may select the wireless communication channel to be used by wireless communication network 105, for example, upon roaming of an active virtual MAC client, or re-association of an active virtual MAC client.

In another example, channel selector 114 may select the wireless communication channel to be used by wireless communication network 105, for example, upon indication of an active service discovery, or a neighborhood Area Network (NAN) cluster.

In another example, channel selector 114 may select the wireless communication channel to be used by wireless communication network 105, for example, responsive to a change request of latency mode of a virtual MAC.

In another example, channel selector 114 may select the wireless communication channel to be used by wireless communication network 105, for example, upon a change in required or actual channel capacity of a virtual MAC, which may result, for example, from an external command, or from a measurement of actual capacity.

In another example, channel selector 114 may select the wireless communication channel to be used by wireless communication network 105, for example, upon a change in an available channel capacity of the previously selected channel. The available channel capacity may be determined, for example, based on a channel load measurement, jitter and/or latency statistics, statistical data collection, e.g., of clear channel assessments, packet error rates, retransmission rates, and the like.

In another example, channel selector 114 may select the wireless communication channel to be used by wireless communication network 105 based on any other channel-switching criterion.

In some demonstrative embodiments, channel selector 114 may switch wireless communication network 105 to the selected channel, for example, by initiating a channel switching process, e.g., using a Wi-Fi P2P extended Channel Switch Announcement. Alternatively, channel selector 114 may switch wireless communication network 105 to the selected channel, for example, by re-establishing wireless communication network 105 on the selected channel.

In some demonstrative embodiments, channel selector 114 may be configured to select the wireless communication channel to be used by wireless communication network 105, for example, based on one or more predefined constraints, for example, regulatory limitations in a specific geography, channel capabilities of peer devices in network 105, e.g., device 160, and/or one or more other constraints and/or criteria, which may be defined with respect to the selection of the wireless communication channel to be used by wireless communication network 105, e.g., as described below.

In some demonstrative embodiments, channel selector 114 may be configured to select the wireless communication channel to be used by wireless communication network 105 from a plurality of potential wireless communication channels. The plurality of potential wireless communication channels may include, for example, a plurality of wireless communication channels, which may be used by wireless communication network 105, for example, subject to one or more predefined criteria, e.g., as described below.

In some demonstrative embodiments, channel selector 114 may be configured to select the wireless communication channel ("the selected channel") to be used by wireless communication network 105, for example, while taking into account an impact of the selected channel on wireless communication network 101. For example, channel selector 114 may be configured to determine the selected channel, for example, while taking into account an impact on throughput, latency and/or any other parameter or attribute of wireless communication network 101, e.g., as described below.

In one example, the selected channel may have an impact on network 101, for example, on a channel load of network 101, e.g., if the selected channel at least partially overlaps the channel being used by network 101.

In another example, the selected channel may have an impact on network 101, for example, even if there is no overlap between the selected channel and the channel being used by network 101. For example, if networks 101 and 105 are operating on a frequency band, which may also be used by a frequency-hopping network, e.g., a Bluetooth network. According to this example, the Bluetooth network may operate on selected channel and/or the channel being used by network 101, for example, based on the frequency of the selected channel.

In some demonstrative embodiments, channel selector 114 may be configured to determine the selected channel, for example, based on one or more parameters ("the selection parameters") corresponding to the plurality of potential wireless communication channels, e.g., as described below. For example, channel selector 114 may be configured to determine the selected channel based on an available channel capacity of the selected channel, an expected throughput of the selected channel, a packet error rate, a channel load, a profile of traffic, noise and/or interference, and/or any other parameter.

In some demonstrative embodiments, channel selector 114 may be configured to determine the selected channel, for example, based on a number of different channels to be concurrently used by wireless communication device 120. For example, channel selector 114 may be configured to determine the selected channel, for example, based on a selection criterion directed to minimize a number of concurrent channels used by wireless communication device 120. Minimizing the number of concurrent channels used by wireless communication device 120 may reduce or eliminate channel switches and/or multi-band frequency hopping, e.g., between networks 101 and 105.

In some demonstrative embodiments, reducing the number of channel switches and/or multi-band frequency hopping operations may improve a performance of networks 105 and/or 101. For example, when performing a channel switch between first and second channels, device 120 may not be present in any of the first and second channels during a channel-switching time period, in which radio 122 is to tune to the second channel, adjust operating parameters and/or stabilize operation in the first channel. In opposed to switching between multiple channels, sharing a single channel by multiple connections, e.g., by networks 101 and 105, may enable device 120 to be present concurrently in multiple networks, e.g., networks 101 and 105. Additionally, having device 120 switch between two or more channels may have an overhead, e.g., in the form of notification messages, which may be sent from device 120 to peer devices on network 105, e.g., device 160, in order to notify the peer devices of a time at which device 120 is to switch out of an operating channel of network 105, and/or a time at which device 120 is to return to the operating channel of network 105. This overhead may have an impact on connection robustness, e.g., in a congested or noisy environment.

In some demonstrative embodiments, channel selector 114 may configure the selected channel to have a configuration different from a configuration of the channel utilized by network 101. For example, channel selector 114 may configure the selected channel to have a channel bandwidth different from a channel bandwidth utilized by network 101, to use a number of orthogonal streams in a Multi-Input-Multi-Output (MIMO) mode different from a number of orthogonal streams utilized by network 101, and/or to use an encoding mode different from an encoding mode utilized by network 101. In one example, channel selector 114 may configure the selected channel to have a configuration different from the configuration of the channel utilized by network 101, if device 120 is capable of providing improved capabilities in network 105, e.g., a data rate, a channel bandwidth and/or MIMO capabilities, compared, for example, to respective capabilities provided by device 140 in network 101.

In some demonstrative embodiments, changing an operating channel of network 105, for example, when traffic is already being communicated in network 105, may result in an intermittent interruption to the traffic, which may impact user experience.

In some demonstrative embodiments, channel selector 114 may estimate an operating channel switching time for switching the operating channel to another channel, e.g., based on capabilities of device 120 and/or capabilities of peer devices in network 105, e.g., device 160. The operating channel switching time may depend, for example, on a capability of all peer devices in network 105 to support a protocol of Extended Channel Switch Announcement (ECSA), which may allow switching the operating channel, e.g., without the need to reestablish a network connection.

In some demonstrative embodiments, channel selector 114 may be configured to select whether or not to change the operating channel of network 105, e.g., based on the user impact resulting from the switching time.

In some demonstrative embodiments, channel selector 114 may determine the selected channel, for example, while taking into consideration a requirement for periodic presence of device 120 in one or more predetermined channels, e.g., for network and service discovery, for maintaining time synchronization of devices in a service cluster, and the like. Selecting to operate network 105 on one of the predetermined channels may have the disadvantage of losing part of the channel capacity. However, selecting to operate network 105 on one of the predetermined channels may have the advantage of reducing the required number of channel hops, and/or enabling concurrent presence in multiple networks.

In some demonstrative embodiments, channel selector 114 may be configured to grade the plurality of potential wireless communication channels based on a predefined channel grading scheme, e.g., as described below.

In some demonstrative embodiments, channel selector 114 may determine a plurality of channel grades corresponding to the plurality of potential wireless communication channels, and may select, based on the plurality of channel grades, the selected channel to be used by network 105, e.g., as described below. For example, channel selector 114 may determine the selected channel to include a wireless communication channel having a best, e.g., highest, channel grade, e.g., compared to all other potential wireless communication channels.

In some demonstrative embodiments, the channel-grading scheme may be configured to determine the channel grades based on one or more performance requirements corresponding to traffic to be communicated over the selected channel, e.g., as described below.

In some demonstrative embodiments, the channel-grading scheme may be configured to determine the channel grades based on a relationship between required values of one or more performance parameters and available values of the one or more performance parameters on the selected channel.

In one example, the channel-grading scheme may be configured to determine a channel grade of a channel based on a required level of Quality of Service (QoS), e.g., as required by traffic to be communicated over network 105, versus an available level of QoS quality, e.g., as may be provided by the channel.

In another example, the channel-grading scheme may be configured to determine a channel grade of the channel based on a required latency, e.g., as required by traffic to be communicated over network 105, versus an available latency, e.g., as may be provided by the channel.

In another example, the channel-grading scheme may be configured to determine a channel grade of the channel based on a required jitter, e.g., as required by traffic to be communicated over network 105, versus an available jitter, e.g., as may be provided by the channel.

In some demonstrative embodiments, the required levels of the performance parameters may be based, for example, on one or more applications communicating the traffic, and/or on one or more user preferences of a user of wireless communication device 120.

In some demonstrative embodiments, the channel-grading scheme may be configured to take into consideration both the required performance parameters for communication over network 105, as well as required performance parameters for communication over network 101.

In some demonstrative embodiments, the channel-grading scheme may include a combination of grading criteria, for example, including at least one performance-based grading criterion, e.g., relating to one or more performance parameters defined with respect to one or more applications to be served; at least one channel-condition grading criterion, e.g., relating to at least one condition of a channel being graded; and/or at least one other predefined grading criterion, e.g., defined by a user of device 120.

In one example, the channel-grading scheme may be configured to grade the plurality of potential channels, for example, by grading a particular channel based on a combination of a plurality of criteria, for example, a required QoS of the applications being served on networks 101 and 105, versus an available QoS provided by network 105 using the particular channel, and an available QoS provided by the network 101, if the particular channel is used by network 105; a required latency of the applications being served on networks 101 and 105, versus an available latency provided by network 105 using the particular channel, and an available latency provided by the network 101, if the particular channel is used by network 105; a channel capacity provided by network 105 using the particular channel, and a channel capacity provided by the network 101, if the particular channel is used by network 105; a channel load of particular channel in network 105, and a channel load in network 101, if the particular channel is used by network 105; a number and timing of periodic out of band activities, e.g., service discovery; a channel preference provided by other connectivity modules, e.g., interference of collocated communication devices, such as cellular and/or Bluetooth devices, or other interfering aggressors, such as system clocks; and/or one or more predefined channel-selection preferences, e.g., provided externally by the user of device 120, an operating system of device 120, connection management utilities, specific applications and the like.

In some demonstrative embodiments, channel selector 114 may repeat the grading of the plurality of channels, for example, upon a change, e.g., any change or a change satisfying a predefined update criterion, in one or more parameters of the channel-grading scheme. In other embodiments, channel selector 114 may grade the plurality of channels at any other timing, for example, before performing a channel switching operation.

In some demonstrative embodiments, channel selector 114 may determine a channel grade of a potential wireless communication channel according to a weighted function of a plurality of channel assessment parameters corresponding to the potential wireless communication channel, e.g., as described below.

In some demonstrative embodiments, the plurality of channel assessment parameters may include a channel load of the potential wireless communication channel, e.g., as described below. For example, the channel load of the potential wireless communication channel with respect to network 105 may be measured by device 120, and/or the channel load of the potential wireless communication channel with respect to network 101 may be measured by an AP of network 101, e.g., device 140.

In some demonstrative embodiments, the plurality of channel assessment parameters may include an estimated Physical Layer (PHY) rate corresponding to the potential wireless communication channel. For example, the plurality of channel assessment parameters may include an estimated upstream PHY rate and/or an estimated downstream PHY rate corresponding to the potential wireless communication channel. The upstream PHY rate and/or downstream PHY rate may be estimated, for example, based on Received-Signal-Strength (RSS) measurements, for example, based on RSS indicators (RSSI), e.g., as described below.

In some demonstrative embodiments, the plurality of channel assessment parameters may include a distribution of channel traffic according to Access Category (AC) over the potential wireless communication channel. For example, the distribution of channel traffic per AC may be determined in terms of a number of frames of an AC per time interval and/or in terms of aggregated frame duration in a time interval, e.g., as described below.

In some demonstrative embodiments, the plurality of channel assessment parameters may include a relationship between packet length and transmit opportunity (TxOP) duration over the potential wireless communication channel, e.g., as described below. For example, a long packet and/or a long TxOP may result in increased latency.

In some demonstrative embodiments, the plurality of channel assessment parameters may include a collision probability over the potential wireless communication channel. For example, the collision probability in networks 101 and 105 may be determined based on a number of stations in networks 101 and 105, respectively, and/or based on a percentage of protected communications in networks 101 and/or 105, e.g., as described below.

In some demonstrative embodiments, the plurality of channel assessment parameters may include distributions of Received-Signal-Strength levels, e.g., RSSI levels, over the potential wireless communication channel. For example, a high number of frames having a low RSSI may indicate an increased probability of collisions over the channel. The distributions of Received-Signal-Strength levels may provide better reliability with respect to the probability of collisions, for example, compared to reliability of a clear channel assessment.

In some demonstrative embodiments, the plurality of channel assessment parameters may include the transmission energy over the potential wireless communication channel. For example, the transmission energy may include a transmission energy per bit, e.g., as described below. Grading the channels using the transmission energy may enable selecting a channel, which may optimize power consumption of device 120, e.g., to prolong battery life of a battery of device 120, for example, if device 120 is a battery-operated device, e.g., a mobile device.

In some demonstrative embodiments, the plurality of channel assessment parameters may include any other additional or alternative channel assessment parameters, e.g., as described below.

In some demonstrative embodiments, channel selector 114 may determine the channel grade of the potential wireless communication channel based on a combination of a first grading value corresponding to network 105 and a second grading value corresponding to network 101, e.g., as described below.

In some demonstrative embodiments, the first grading value may be a result of a first weighted function of the plurality of channel assessment parameters corresponding to the potential wireless communication channel, if used for network 105; and the second grading value may be a result of a second weighted function of a plurality of channel assessment parameters corresponding to network 101, subject to communication of network 105 being performed over the potential wireless communication channel, e.g., as described below.

In some demonstrative embodiments, channel selector 114 may determine the channel grade of the potential wireless communication channel based on an arithmetic mean of the first and second grading values corresponding to the potential wireless communication channel, e.g., as described below. In other embodiments, channel selector 114 may determine the channel grade of the potential wireless communication channel based on a weighted average and/or any other function of the first and second grading values corresponding to the potential wireless communication channel.

In some demonstrative embodiments, channel selector 114 may use the same weighted function to determine both the first and second grading values. For example, the first and second weighted functions may use the same channel assessment parameters and the same weighting coefficients.

In other embodiments, channel selector 114 may use different weighted functions to determine both the first and second grading values. In one example, the first weighted function may include one or more channel assessment parameters, which are not included in the second weighted function; and/or the second weighted function may include one or more channel assessment parameters, which are not included in the first weighted function. Additionally or alternatively, the first and second weighted functions may utilize one or more different weighting coefficients.

In some demonstrative embodiments, channel selector 114 may determine one or more weighting coefficients of the first and/or second weighted functions, based on one or more performance requirements corresponding to traffic to be communicated over the selected wireless communication channel.

For example, channel selector 114 may determine the weighting coefficients of the first weighted function, which is used to determine the first grading value, based on a capacity requirement by applications being served over network 105, a latency requirement of the applications being served over network 105, and/or a jitter requirement of the applications being served over network 105. Channel selector 114 may determine, for example, the weighting coefficients of the second weighted function, which is used to determine the second grading value, based on a capacity requirement by applications being served over network 101, a latency requirement of the applications being served over network 101, and/or a jitter requirement of the applications being served over network 101.

In some demonstrative embodiments, channel selector 114 may determine one or more weighting coefficients of the first and/or second weighted functions, based on one or more power constraints of wireless communication device 120. The power constraints may include, for example, one or more power versus performance tradeoffs, which may be defined with respect to a battery level of wireless communication device 120. The power constraints may be set, for example, by the user of device 120, and/or by the OS of device 120.

In some demonstrative embodiments, channel selector 114 may dynamically update the weighting coefficients of the first and/or second weighted functions, for example, based on one or more changes in the performance requirements and/or power constraints. In other embodiments, channel selector 114 may set and/or maintain the weighting coefficients according to one or more present weighing coefficients.

In some demonstrative embodiments, channel selector 114 may be configured to assign one or more predefined highest grades to one or more channels, which are active in network 101 and/or network 105, e.g., as described below. For example, the one or more highest grades may be higher than grades assigned to any other channels, which are not active on in any of networks 101 and 105.

In some demonstrative embodiments, channel selector 114 may be configured to assign the one or more highest grades to one or more channels which are to communicate low-latency traffic over networks 101 and/or 105, e.g., as described below.

In some demonstrative embodiments, channel selector 114 may be configured to assign a first highest grade to an active wireless communication channel being used by network 101, e.g., if the active channel is being used to communicate low latency traffic. The first highest grade may be, for example, the highest of the one or more highest grades.

In some demonstrative embodiments, channel selector 114 may be configured to assign a second highest grade to an active wireless communication channel being used by network 105, e.g., if the channel is being used to communicate low latency traffic to a P2P client. The second highest grade may be, for example, the second highest of the one or more highest grades.

In some demonstrative embodiments, channel selector 114 may be configured to assign a third highest grade to an active wireless communication channel being used by network 105, e.g., f the channel is being used to communicate low latency traffic of a TDLS connection. The third highest grade may be, for example, the third highest of the one or more highest grades.

In some demonstrative embodiments, channel selector 114 may be configured to assign a fourth highest grade to an active wireless communication channel being used by network 105 for periodic discovery or for a NAN cluster. The fourth highest grade may be, for example, the fourth highest of the one or more highest grades.

In other embodiments, the first, second, third and fourth highest grades may be set according to any other and/or any additional or alternative highest grades may be assigned according to any additional and/or alternative criterion.

In some demonstrative embodiments, channel selector 114 may be configured to assign a predefined lowest grade, e.g., the grade "0", to a particular channel, for example, if network 105 is operating over a different channel, and switching network 105 to the particular channel requires a network reconnection operation, e.g., if one or more devices of network 105 do not support ECSA messaging.

In some demonstrative embodiments, channel selector 114 may be configured to assign a predefined lowest grade, e.g., the grade "0", to a particular channel, if a capacity of the particular channel does not support a required capacity of networks 101 and 105.

In some demonstrative embodiments, channel selector 114 may be configured to assign a predefined lowest grade, e.g., the grade "0", to a particular channel, if communication over the particular channel is to be avoided, e.g., according to regulations.

In some demonstrative embodiments, channel selector 114 may grade the plurality of potential wireless communication channel according to a predefined grading scale. For example, channel selector 114 may assign to a potential wireless communication channel a grade within a predefined grade range, e.g., a grade in the range 0-100, or any other range. For example, the grade "0" may be a lowest grade, and the grade "100" may be a highest grade. Any other grade range and/or scale may be used.

Figure 2:
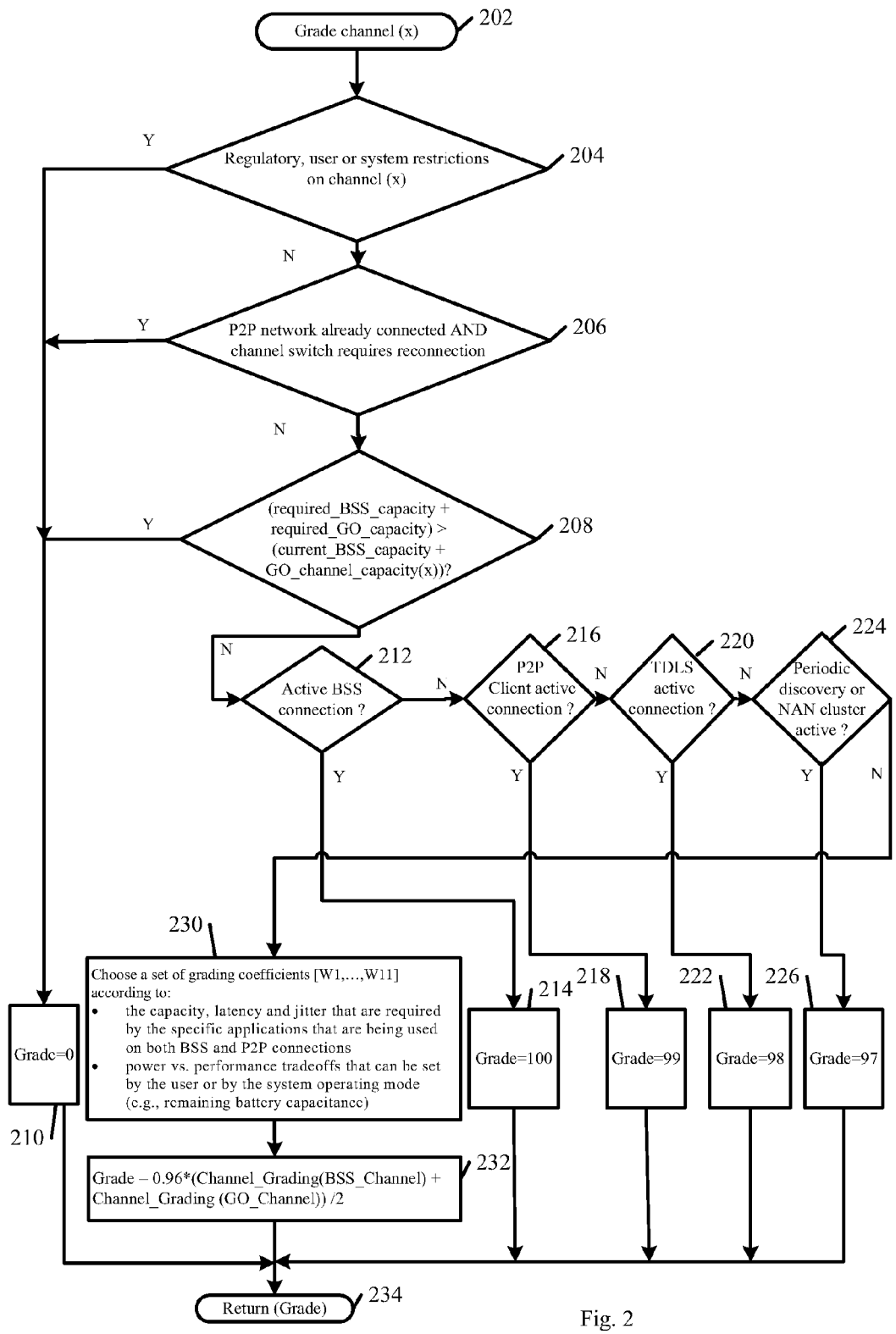
FIG. 2 is a schematic flow-chart illustration of a method of channel grading, in accordance with some demonstrative embodiments.

Reference is made to FIG. 2, which schematically illustrates a method of channel grading, in accordance with some demonstrative embodiments. In one example, one or more of the operations of FIG. 2 may be performed by a P2P GO or a mobile AP to select a channel of a P2P network, while maintaining a connection with an AP of a BSS. For example, one or more of the operations of the method of FIG. 2 may be performed by a channel selector, e.g., channel selector 114 (FIG. 1), to grade a plurality of potential wireless communication channels to be used by a device, e.g., device 120 (FIG. 1), for communication in a first network, e.g., network 105 (FIG. 1), while maintaining connectivity with a second network, e.g., network 101 (FIG. 1).

As indicated at block 202, the method may include determining a particular wireless communication channel to be graded ("the graded channel"). For example, channel selector 114 (FIG. 1) may grade the plurality of potential wireless communication channels, e.g., by iterating over the plurality of potential wireless communication channels.

As indicated at block 204, the method may include determining whether or not the activity over the graded channel may be restricted, e.g., by regulatory or system constraints.

As indicated at block 206, the method may include determining whether or not the first network, e.g., network 105 (FIG. 1), is already active on another channel, and whether switching the first network to the graded channel may require reconnecting the first network on the graded channel.

As indicated at block 206, the method may include determining whether or not a required combined capacity of the first network, e.g., network 105 (FIG. 1), and the second network, e.g., network 101 (FIG. 1), is greater than an available combined capacity of the first and second networks if the first network is to use the graded channel.

As indicated at block 210, the method may include assigning a lowest predefined value, e.g., the grade "0", to the graded channel, for example, if activity over the graded channel is restricted (arrow 205); if the first network is already active on another channel, and switching the first network to the graded channel may require reconnecting the first network on the graded channel (arrow 207); or if the required combined capacity of the first network and the second network is greater than the available combined capacity of the first and second networks if the first network is to use the graded channel (arrow 209).

As indicated at block 212, the method may include determining whether or not an active connection of the second network is over the graded channel, and low latency traffic is to be communicated over the first and/or second networks.

As indicated at block 214, the method may include assigning a predefined first highest grade, e.g., the grade "100", to the graded channel, for example, if the active connection of the second network is over the graded channel.

As indicated at block 216, the method may include determining whether or not an active connection to a client of the first network is over the graded channel, and low latency traffic is to be communicated over the first and/or second networks.

As indicated at block 218, the method may include assigning a predefined second highest grade, e.g., the grade "99", to the graded channel, for example, if an active connection to a client of the first network is over the graded channel, and low latency traffic is to be communicated over the first and/or second networks.

As indicated at block 220, the method may include determining whether or not an active TDLS connection is over the graded channel, and low latency traffic is to be communicated over the first and/or second networks.

As indicated at block 222, the method may include assigning a predefined third highest grade, e.g., the grade "98", to the graded channel, for example, if an active TDLS connection is over the graded channel, and low latency traffic is to be communicated over the first and/or second networks.

As indicated at block 224, the method may include determining whether or not periodic discovery and/or NAN clustering are active, and low latency traffic is to be communicated over the first and/or second networks.

As indicated at block 226, the method may include assigning a predefined fourth highest grade, e.g., the grade "97", to the graded channel, for example, periodic discovery and/or NAN clustering are active, and low latency traffic is to be communicated over the first and/or second networks.

In some demonstrative embodiments, the method may include grading the graded channel according to a weighted function, e.g., as described below, for example, if the graded channel has not been graded based on the criteria listed above.

As indicated at block 230, the method may include determining weighting coefficients to be applied for grading the graded channel.

In some demonstrative embodiments, the method may include determining one or more of the weighting coefficients according to one or more required performance parameters, which maybe defined, for example, by applications using the first and/or second networks. For example, channel selector 114 (FIG. 1) may determine one or more weighting coefficients of the first weighted function and/or one or more weighting coefficients of the second weighted function, for example, based on a capacity requirement, a latency requirement and/or a jitter requirement of one or more applications being served by network 105 and/or network 105, e.g. as described above.

In some demonstrative embodiments, the method may include determining one or more of the weighting coefficients according to one or more channel-selection constraints, which maybe defined, for example, by a user and/or the OS of the wireless communication device. For example, channel selector 114 (FIG. 1) may determine one or more weighting coefficients of the first weighted function and/or one or more weighting coefficients of the second weighted function, for example, based on one or more power versus performance tradeoffs. The power versus performance tradeoffs may be set, for example, by the user and/or the OS of wireless communication device 120 (FIG. 1), for example, with respect to a power consumption and/or a battery level of wireless communication device 120 (FIG. 1), e.g., as described above. a capacity requirement, a latency requirement and/or a jitter requirement of one or more applications being served by network 105 and/or network 105, e.g., as described above.

As indicated at block 232, the method may include determining the grade of the graded channel based on at least one weighted function.

In some demonstrative embodiments, the, method may include grading the channel using a first weighted function corresponding to the first network and a second weighted function corresponding to the second network.

For example, channel selector 114 (FIG. 1) may grade the graded channel based on an arithmetic mean of first and second grading values, the first grading value being a result of a first weighted function of the plurality of channel assessment parameters corresponding to the graded channel if used for network 105 (FIG. 1); and the second grading value being a result of a second weighted function of a plurality of channel assessment parameters corresponding to network 101 (FIG. 1), subject to communication of network 105 (FIG. 1) being performed over the graded channel, e.g., as described above.

In one example, channel selector 114 (FIG. 1) may grade the graded channel, e.g., as follows:

$$\text{Grade}=0.96*\{\text{Channel\_Grading(Network\_1)}+\text{Channel\_Grading(Network\_2)}\}/2 \quad (1)$$

wherein Grade denotes the grade of the graded channel, wherein Channel_Grading(Network_1) denotes the first grading value, and wherein Channel_Grading(Network_2) denotes the second grading value.

In one example, the first grading value may be determined according to a first weighted function corresponding to eleven channel assessment parameters, e.g., as follows:

```
Channel_Grading(Network_1)=
{
W1 * Ext. preference grade [0:100] +
W2 * 0 Internal preference grade [0:100] +
W3 * (100 − Channel_load [0:100]) +
W4 * Channel_capacity[0:100] +
W5 * Upstream_PHY_rate[0:100] +
W6 * Downstream_PHY_rate [0:100] +
W7 * (100 − Channel_Access_Category_Mean_Value[0:100]) +
W8 * (100 − Channel_TXOP_Mean_Value[0:100]) +
W9 * (100 − Collision_Probability(#of_different_stations_on_channel)[0:100)] +
W10 * (100 − Collision_Probability(Percentage_of_stations_with_RSSI_below_Threshold1)[0:100]) +
W11 * (100 − Energy_Per_Transmitted_Bit[0:100])
} /(W1+W2+W3+W4+W5+W6+W7+W8+W9+W10+W11)
``` wherein W1 . . . W11 denote eleven respective weighting coefficients of the first weighted function applied to eleven respective channel assessment parameters, denoted Ext. preference grade, Internal preference grade, Channel_load, Channel_capacity, Upstream_PHY_rate, Downstream_PHY_rate, Channel_Access_Category_Mean_Value, Channel_TXOP_Mean_Value, Cllision_Probability(#of_different_stations_on_channel), Collision_Probability(Percentage_of_stations_with_RSSI_below_Threshold1), and Energy_Per_Transmitted_Bit, e.g., as described below.

In one example, the second grading value may be determined according to a second weighted function corresponding to the eleven channel assessment parameters, e.g., as follows:

```
Channel_Grading(Network_2)=
{
  W1' * Ext. preference grade [0:100] +
  W2' * Internal preference grade [0:100] +
  W3' * (100 − Channel_load [0:100]) +
  W4' * Channel_capacity[0:100] +
  W5' * Upstream_PHY_rate[0:100] +
  W6' * Downstream_PHY_rate[0:100] +
  W7' * (100 − Channel_Access_Category_Mean_Value[0:100]) +
  W8' * (100 − Channel_TXOP_Mean_Value[0:100]) +
  W9' * (100 − Collision_Probability(#of_different_stations_on_channel)[0:100)] +
  W10' * (100 − Collision_Probability(Percentage_of_stations_with_RSSI_below_Threshold1)[0:100]) +
  W11' * (100 − Energy_Per_Transmitted_Bit[0:100])
} /(W1'+W2'+W3'+W4'+W5'+W6'+W7'+W8'+W9'+W10'+W11')
``` wherein W1' . . . W11' denote eleven respective weighting coefficients of the second weighted function applied to the eleven respective channel assessment parameters.

In some demonstrative embodiments, the first and second weighted functions may be identical, e.g., the weighting coefficients W1 . . . W11 may be equal to the respective weighting coefficients W1' . . . W11'. In other embodiments, the first weighted function may be different from the second weighted function, e.g. one or more of the weighting coefficients W1 . . . W11 may be from one or more respective weighting coefficients W1' . . . W11'.

In some demonstrative embodiments, the channel assessment parameter Ext. preference grade of the graded channel may include, for example, a channel assessment parameter, which may optionally be provided by an external entity, for example, an application or a connection manager, and the like, which may provide a plurality of predefined grades corresponding to a respective plurality of channels. For example, the Ext. preference grade of the graded channel may be based on interference to the graded channel, which may be caused by other wireless interfaces and/or elements of wireless communication device 120 (FIG. 1). Additionally or alternatively, the Ext. preference grade of the graded channel may be based on antenna performance over the graded channel, spectrum allocation techniques, specific regulatory limitations corresponding to a location of wireless communication device 120 (FIG. 1), e.g., derived bases information received via a cellular network according to mobile country code, and the like.

In some demonstrative embodiments, the channel assessment parameter Int. preference grade of the graded channel may include, for example, a channel assessment parameter, which may optionally be based on capabilities of wireless communication device 120 (FIG. 1). For example, the channel assessment parameter Ext. preference grade of the graded channel may be determined during development or manufacturing. In one example, the channel assessment parameter Ext. preference grade of the graded channel may include a transmit Error Vector Magnitude (EVM) corresponding to the graded channel, a maximum transmit power corresponding to the graded channel, a receive sensitivity corresponding to the graded channel, interference over the graded channel from other radios of a Multicomm device, e.g., as provided via a communication-to-communication interface, and the like.

In some demonstrative embodiments, the channel assessment parameter Channel_Load of the graded channel with respect to network 105 (FIG. 1) may include, for example, a channel load as measured by device 120 (FIG. 1). The Channel_Load channel assessment parameter of the graded channel with respect to network 101 (FIG. 1) may include, for example, a channel load advertised by the AP of network 101 (FIG. 1), e.g., by device 140 (FIG. 1).

In some demonstrative embodiments, the channel assessment parameters Upstream_PHY_rate and Downstream_PHY_rate of the graded channel with respect to network 105 (FIG. 1) may be determined, for example, based on supported upstream and downstream PHY rates over network 105 (FIG. 1) and RSSI measurements over the graded channel. The channel assessment parameters Upstream_PHY_rate and Downstream_PHY_rate of the graded channel with respect to network 101 (FIG. 1) may be determined, for example, based on supported upstream and downstream PHY rates over network 101 (FIG. 1) and RSSI measurements over the graded channel.

In some demonstrative embodiments, the channel assessment parameter Channel_Access_Category_Mean_Value may be determined based on a distribution, e.g., a histogram, of channel traffic, e.g., in terms of frames within a time interval and/or aggregated frame duration within a time interval, as a function of Access Category.

In some demonstrative embodiments, the channel assessment parameter Channel_TXOP_Mean_Value may be determined based on a distribution of the duration of frames communicated over the graded channel within a time period, for example, such that an increase in a TXOP length or PPDU length will result in a higher value of the channel assessment parameter Channel_TXOP_Mean_Value.

In some demonstrative embodiments, the channel assessment parameter Cllision_Probability(#of_different_stations_on_channel) corresponding to a network, e.g., to network 101 (FIG. 1) or network 105 (FIG. 1), may be determined based on a number of stations in the network and a percentage of protected frames, e.g., using an RTS/CTS mechanism, out of all frames communicated in the network.

In some demonstrative embodiments, the channel assessment parameter Collision_Probability(Percentage_of_stations_with_RSSI_below_Threshold1) corresponding to a network, e.g., to network 101 (FIG. 1) or network 105 (FIG. 1), may be determined based on a distribution of RSSI levels of frames communicated in the network, e.g., a percentage of frames having RSSI levels below a predefined threshold.

As indicated at block 234, the method may include returning the grade of the graded channel. For example, channel selector 114 (FIG. 1) may store the grade of the graded channel and may proceed to grade another channel.

In some demonstrative embodiments, the graded channel may be graded based on a grading scheme, in which the graded channel may be graded by one or more predefined lowest grades and/or one or more predefined highest grades, for example, if one or more predefined criteria are met; or according to a weighted function, for example, if the criteria are not met, e.g., as described above. However, in other embodiments, all channels may be graded according to a weighted function, which may take into account the one or more criteria.

Figure 3:
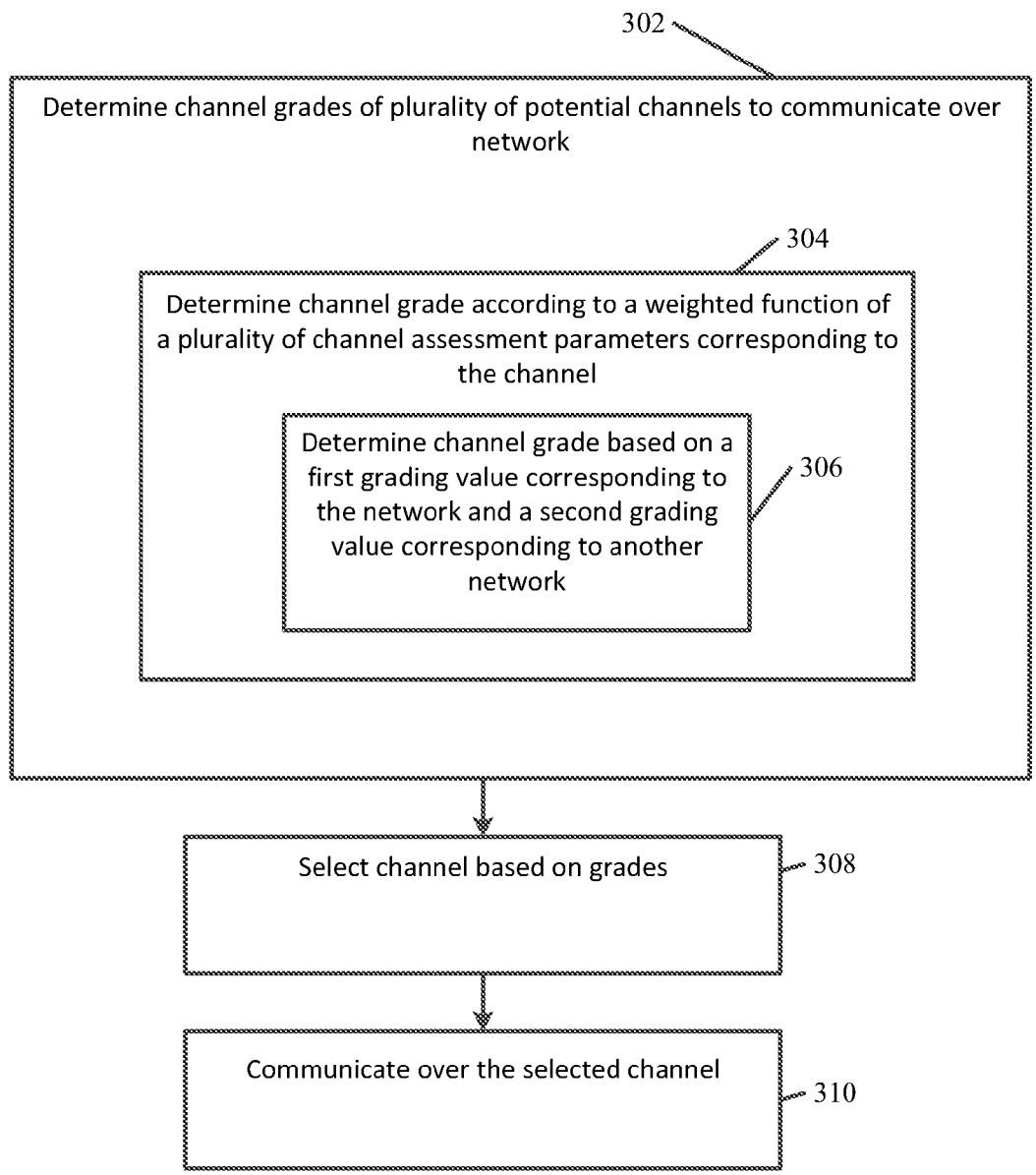
FIG. 3 is a schematic flow-chart illustration of a method of selecting a wireless communication channel, in accordance with some demonstrative embodiments.

Reference is made to FIG. 3, which schematically illustrates a method of selecting a wireless communication channel, in accordance with some demonstrative embodiments. In some demonstrative embodiments, one or more of the operations of the method of FIG. 3 may be performed by one or more elements of a system, e.g., system 100 (FIG. 1), a wireless communication device, e.g., wireless communication device 120 (FIG. 1), and/or a channel selector, e.g., channel selector 114 (FIG. 1).

As indicated at block 302, the method may include determining a plurality of channel grades of a respective plurality of potential wireless communication channels to be used for communication over a wireless communication network. For example, channel selector 114 (FIG. 1) may determine a plurality of grades corresponding to the plurality of potential wireless communication channels to be used by network 105 (FIG. 1), e.g., as described above.

As indicated at block 304, determining the plurality of channel grades may include determining a channel grade of a potential wireless communication channel according to a weighted function of a plurality of channel assessment parameters corresponding to the potential wireless communication channel. For example, channel selector 114 (FIG. 1) may determine the grad of the potential wireless communication channel based on the weighted function, e.g., as described above.

As indicated at block 306, determining the channel grade of the potential wireless communication channel may include determining the channel grade of the potential wireless communication channel based on a combination of a first grading value corresponding to the wireless communication network and a second grading value corresponding to a second wireless communication network. For example, channel selector 114 (FIG. 1) may determine the first grading value according to Equation 1, e.g., as described above.

As indicated at block 308, the method may include selecting, based on the plurality of channel grades, a selected wireless communication channel from the plurality of potential wireless communication channels. For example, channel selector 114 (FIG. 1) may determine the selected channel to include the potential channel having the highest grade, e.g., as described above As indicated at block 310, the method may include communicating over the selected wireless communication channel. For example, radio 122 (FIG. 1) may communicate over the channel selected by channel selector 114 (FIG. 1), e.g., as described above.

Figure 4:
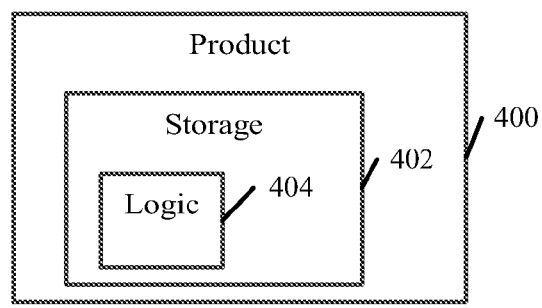
FIG. 4 is a schematic illustration of a product of manufacture, in accordance with some demonstrative embodiments.

Reference is made to FIG. 4, which schematically illustrates a product of manufacture 400, in accordance with some demonstrative embodiments. Product 400 may include one or more tangible computer readable non-transitory storage media 402 to store logic 404, which may be used, for example, to perform at least part of the functionality of device 120 (FIG. 1), and/or channel selector 114 (FIG. 1), and/or to perform one or more operations of the method of FIGS. 2 and/or 3. The phrase "non-transitory machine-readable medium" is directed to include all computer-readable media, with the sole exception being a transitory propagating signal.

In some demonstrative embodiments, product 400 and/or machine-readable storage media 402 may include one or more types of computer-readable storage media capable of storing data, including volatile memory, non-volatile memory, removable or non-removable memory, erasable or non-erasable memory, writeable or re-writeable memory, and the like. For example, machine-readable storage media 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a wireless communication device comprising a channel selector to determine a plurality of channel grades of a respective plurality of potential wireless communication channels, the channel selector to determine a channel grade of the plurality of channel grades according to a weighted function of a plurality of channel assessment parameters corresponding to a potential wireless communication channel of the plurality of potential wireless communication channels, wherein the channel selector is to select, based on the plurality of channel grades, a selected wireless communication channel from the plurality of potential wireless communication channels; and a radio to communicate over the selected wireless communication channel.

Example 2 includes the subject matter of Example 1, and optionally, wherein the wireless communication device is to communicate with a first wireless network over the selected wireless communication channel, while concurrently communicating with a second wireless network over a network wireless communication channel.

Example 3 includes the subject matter of Example 2, and optionally, wherein the channel selector is to determine the channel grade of the potential wireless communication channel based on a combination of a first grading value and a second grading value, the first grading value being a result of the weighted function of the plurality of channel assessment parameters corresponding to the potential wireless communication channel, and the second grading value being a result of a weighted function of a plurality of channel assessment parameters corresponding to the network wireless communication channel subject to communication of the first wireless network over the potential wireless communication channel.

Example 4 includes the subject matter of Example 2 or 3, and optionally, wherein the channel selector is to assign one or more predefined highest grades to one or more potential channels, which are active in the first wireless network or the second wireless network.

Example 5 includes the subject matter of any one of Examples 2-4, and optionally, wherein the channel selector is to assign a predefined lowest grade to a particular channel, if switching the first wireless network to the particular channel requires a reconnection operation.

Example 6 includes the subject matter of any one of Examples 2-5, and optionally, wherein the channel selector is to assign a predefined lowest grade to a particular channel, if a capacity of the particular channel does not support a required capacity of the first and second wireless networks.

Example 7 includes the subject matter of any one of Examples 2-6, and optionally, wherein the wireless communication device is to perform the functionality of a Peer-to-Peer (P2P) Group Owner (GO) of the first wireless network, and to communicate with an access point of the second wireless network via the network wireless communication channel.

Example 8 includes the subject matter of any one of Examples 1-7, and optionally, wherein the channel selector is to determine one or more weighting coefficients of the weighted function based on one or more performance requirements corresponding to traffic to be communicated over the selected wireless communication channel.

Example 9 includes the subject matter of Example 8, and optionally, wherein the one or more performance requirements comprise at least one requirement selected from the group consisting of a capacity requirement, a latency requirement, and a jitter requirement.

Example 10 includes the subject matter of any one of Examples 1-9, and optionally, wherein the channel selector is to determine one or more weighting coefficients of the weighted function based on one or more power constraints of the wireless communication device.

Example 11 includes the subject matter of any one of Examples 1-10, and optionally, wherein the one or more performance parameters comprise at least one parameter selected from the group consisting of a channel load of the potential wireless communication channel, an estimated Physical Layer (PHY) rate corresponding to the potential wireless communication channel, a distribution of channel traffic according to Access Category (AC) over the potential wireless communication channel, a relationship between packet length and transmit opportunity duration over the potential wireless communication channel, a collision probability over the potential wireless communication channel, distributions of Received-Signal-Strength over the potential wireless communication channel, and a transmission energy over the potential wireless communication channel.

Example 12 includes a wireless communication system comprising one or more antennas; a memory; a processor; a channel selector to determine a plurality of channel grades of a respective plurality of potential wireless communication channels, the channel selector to determine a channel grade of the plurality of channel grades according to a weighted function of a plurality of channel assessment parameters corresponding to a potential wireless communication channel of the plurality of potential wireless communication channels, wherein the channel selector is to select, based on the plurality of channel grades, a selected wireless communication channel from the plurality of potential wireless communication channels; and a radio to communicate via the one or more antennas over the selected wireless communication channel.

Example 13 includes the subject matter of Example 12, and optionally, wherein the radio is to communicate with a first wireless network over the selected wireless communication channel, while concurrently communicating with a second wireless network over a network wireless communication channel.

Example 14 includes the subject matter of Example 13, and optionally, wherein the channel selector is to determine the channel grade of the potential wireless communication channel based on a combination of a first grading value and a second grading value, the first grading value being a result of the weighted function of the plurality of channel assessment parameters corresponding to the potential wireless communication channel, and the second grading value being a result of a weighted function of a plurality of channel assessment parameters corresponding to the network wireless communication channel subject to communication of the first wireless network over the potential wireless communication channel.

Example 15 includes the subject matter of Example 13 or 14, and optionally, wherein the channel selector is to assign one or more predefined highest grades to one or more potential channels, which are active in the first wireless network or the second wireless network.

Example 16 includes the subject matter of any one of Examples 13-15, and optionally, wherein the channel selector is to assign a predefined lowest grade to a particular channel, if switching the first wireless network to the particular channel requires a reconnection operation.

Example 17 includes the subject matter of any one of Examples 13-16, and optionally, wherein the channel selector is to assign a predefined lowest grade to a particular channel, if a capacity of the particular channel does not support a required capacity of the first and second wireless networks.

Example 18 includes the subject matter of any one of Examples 13-17, and optionally, wherein the radio is to communicate as a Peer-to-Peer (P2P) Group Owner (GO) of the first wireless network, and to communicate with an access point of the second wireless network via the network wireless communication channel.

Example 19 includes the subject matter of any one of Examples 12-18, and optionally, wherein the channel selector is to determine one or more weighting coefficients of the weighted function based on one or more performance requirements corresponding to traffic to be communicated over the selected wireless communication channel.

Example 20 includes the subject matter of Example 19, and optionally, wherein the one or more performance requirements comprise at least one requirement selected from the group consisting of a capacity requirement, a latency requirement, and a jitter requirement.

Example 21 includes the subject matter of any one of Examples 12-20, and optionally, wherein the channel selector is to determine one or more weighting coefficients of the weighted function based on one or more power constraints.

Example 22 includes the subject matter of any one of Examples 12-21, and optionally, wherein the one or more performance parameters comprise at least one parameter selected from the group consisting of a channel load of the potential wireless communication channel, an estimated Physical Layer (PHY) rate corresponding to the potential wireless communication channel, a distribution of channel traffic according to Access Category (AC) over the potential wireless communication channel, a relationship between packet length and transmit opportunity duration over the potential wireless communication channel, a collision probability over the potential wireless communication channel, distributions of Received-Signal-Strength over the potential wireless communication channel, and a transmission energy over the potential wireless communication channel.

Example 23 includes a method of wireless communication, the method comprising determining a plurality of channel grades of a respective plurality of potential wireless communication channels, wherein determining the plurality of channel grades comprises determining a channel grade of the plurality of channel grades according to a weighted function of a plurality of channel assessment parameters corresponding to a potential wireless communication channel of the plurality of potential wireless communication channels; selecting, based on the plurality of channel grades, a selected wireless communication channel from the plurality of potential wireless communication channels; and communicating over the selected wireless communication channel.

Example 24 includes the subject matter of Example 23, and optionally, comprising communicating with a first wireless network over the selected wireless communication channel, while concurrently communicating with a second wireless network over a network wireless communication channel.

Example 25 includes the subject matter of Example 24, and optionally, comprising determining the channel grade of the potential wireless communication channel based on a combination of a first grading value and a second grading value, the first grading value being a result of the weighted function of the plurality of channel assessment parameters corresponding to the potential wireless communication channel, and the second grading value being a result of a weighted function of a plurality of channel assessment parameters corresponding to the network wireless communication channel subject to communication of the first wireless network over the potential wireless communication channel.

Example 26 includes the subject matter of Example 24 or 25, and optionally, comprising assigning one or more predefined highest grades to one or more potential channels, which are active in the first wireless network or the second wireless network.

Example 27 includes the subject matter of any one of Examples 24-26, and optionally, comprising assigning a predefined lowest grade to a particular channel, if switching the first wireless network to the particular channel requires a reconnection operation.

Example 28 includes the subject matter of any one of Examples 24-27, and optionally, comprising assigning a predefined lowest grade to a particular channel, if a capacity of the particular channel does not support a required capacity of the first and second wireless networks.

Example 29 includes the subject matter of any one of Examples 24-28, and optionally, comprising performing the functionality of a Peer-to-Peer (P2P) Group Owner (GO) of the first wireless network, and communicating with an access point of the second wireless network via the network wireless communication channel.

Example 30 includes the subject matter of any one of Examples 23-29, and optionally, comprising determining one or more weighting coefficients of the weighted function based on one or more performance requirements corresponding to traffic to be communicated over the selected wireless communication channel.

Example 31 includes the subject matter of Example 30, and optionally, wherein the one or more performance requirements comprise at least one requirement selected from the group consisting of a capacity requirement, a latency requirement, and a jitter requirement.

Example 32 includes the subject matter of any one of Examples 23-31, and optionally, comprising determining one or more weighting coefficients of the weighted function based on one or more power constraints.

Example 33 includes the subject matter of any one of Examples 23-32, and optionally, wherein the one or more performance parameters comprise at least one parameter selected from the group consisting of a channel load of the potential wireless communication channel, an estimated Physical Layer (PHY) rate corresponding to the potential wireless communication channel, a distribution of channel traffic according to Access Category (AC) over the potential wireless communication channel, a relationship between packet length and transmit opportunity duration over the potential wireless communication channel, a collision probability over the potential wireless communication channel, distributions of Received-Signal-Strength over the potential wireless communication channel, and a transmission energy over the potential wireless communication channel.

Example 34 includes a product including one or more tangible computer-readable non-transitory storage media comprising computer-executable instructions operable to, when executed by at least one computer processor, enable the at least one computer processor to implement a method comprising determining a plurality of channel grades of a respective plurality of potential wireless communication channels, wherein determining the plurality of channel grades comprises determining a channel grade of the plurality of channel grades according to a weighted function of a plurality of channel assessment parameters corresponding to a potential wireless communication channel of the plurality of potential wireless communication channels; selecting, based on the plurality of channel grades, a selected wireless communication channel from the plurality of potential wireless communication channels; and communicating over the selected wireless communication channel.

Example 35 includes the subject matter of Example 34, and optionally, wherein the method comprises communicating with a first wireless network over the selected wireless communication channel, while concurrently communicating with a second wireless network over a network wireless communication channel.

Example 36 includes the subject matter of Example 35, and optionally, wherein the method comprises determining the channel grade of the potential wireless communication channel based on a combination of a first grading value and a second grading value, the first grading value being a result of the weighted function of the plurality of channel assessment parameters corresponding to the potential wireless communication channel, and the second grading value being a result of a weighted function of a plurality of channel assessment parameters corresponding to the network wireless communication channel subject to communication of the first wireless network over the potential wireless communication channel.

Example 37 includes the subject matter of Example 35 or 36, and optionally, wherein the method comprises assigning one or more predefined highest grades to one or more potential channels, which are active in the first wireless network or the second wireless network.

Example 38 includes the subject matter of any one of Examples 35-37, and optionally, wherein the method comprises assigning a predefined lowest grade to a particular channel, if switching the first wireless network to the particular channel requires a reconnection operation.

Example 39 includes the subject matter of any one of Examples 35-38, and optionally, wherein the method comprises assigning a predefined lowest grade to a particular channel, if a capacity of the particular channel does not support a required capacity of the first and second wireless networks.

Example 40 includes the subject matter of any one of Examples 35-39, and optionally, wherein the method comprises performing the functionality of a Peer-to-Peer (P2P) Group Owner (GO) of the first wireless network, and communicating with an access point of the second wireless network via the network wireless communication channel.

Example 41 includes the subject matter of any one of Examples 34-40, and optionally, wherein the method comprises determining one or more weighting coefficients of the weighted function based on one or more performance requirements corresponding to traffic to be communicated over the selected wireless communication channel.

Example 42 includes the subject matter of Example 41, and optionally, wherein the one or more performance requirements comprise at least one requirement selected from the group consisting of a capacity requirement, a latency requirement, and a jitter requirement.

Example 43 includes the subject matter of any one of Examples 34-42, and optionally, wherein the method comprises determining one or more weighting coefficients of the weighted function based on one or more power constraints.

Example 44 includes the subject matter of any one of Examples 34-43, and optionally, wherein the one or more performance parameters comprise at least one parameter selected from the group consisting of a channel load of the potential wireless communication channel, an estimated Physical Layer (PHY) rate corresponding to the potential wireless communication channel, a distribution of channel traffic according to Access Category (AC) over the potential wireless communication channel, a relationship between packet length and transmit opportunity duration over the potential wireless communication channel, a collision probability over the potential wireless communication channel, distributions of Received-Signal-Strength over the potential wireless communication channel, and a transmission energy over the potential wireless communication channel.

Example 45 includes an apparatus comprising means for determining a plurality of channel grades of a respective plurality of potential wireless communication channels, wherein determining the plurality of channel grades comprises determining a channel grade of the plurality of channel grades according to a weighted function of a plurality of channel assessment parameters corresponding to a potential wireless communication channel of the plurality of potential wireless communication channels; means for selecting, based on the plurality of channel grades, a selected wireless communication channel from the plurality of potential wireless communication channels; and means for communicating over the selected wireless communication channel.

Example 46 includes the subject matter of Example 45, and optionally, comprising means for communicating with a first wireless network over the selected wireless communication channel, while concurrently communicating with a second wireless network over a network wireless communication channel.

Example 47 includes the subject matter of Example 46, and optionally, comprising means for determining the channel grade of the potential wireless communication channel based on a combination of a first grading value and a second grading value, the first grading value being a result of the weighted function of the plurality of channel assessment parameters corresponding to the potential wireless communication channel, and the second grading value being a result of a weighted function of a plurality of channel assessment parameters corresponding to the network wireless communication channel subject to communication of the first wireless network over the potential wireless communication channel.

Example 48 includes the subject matter of Example 46 or 47, and optionally, comprising means for assigning one or more predefined highest grades to one or more potential channels, which are active in the first wireless network or the second wireless network.

Example 49 includes the subject matter of any one of Examples 46-48, and optionally, comprising means for assigning a predefined lowest grade to a particular channel, if switching the first wireless network to the particular channel requires a reconnection operation.

Example 50 includes the subject matter of any one of Examples 46-49, and optionally, comprising means for assigning a predefined lowest grade to a particular channel, if a capacity of the particular channel does not support a required capacity of the first and second wireless networks.

Example 51 includes the subject matter of any one of Examples 46-50, and optionally, comprising means for performing the functionality of a Peer-to-Peer (P2P) Group Owner (GO) of the first wireless network, and communicating with an access point of the second wireless network via the network wireless communication channel.

Example 52 includes the subject matter of any one of Examples 45-51, and optionally, comprising means for determining one or more weighting coefficients of the weighted function based on one or more performance requirements corresponding to traffic to be communicated over the selected wireless communication channel.

Example 53 includes the subject matter of Example 52, and optionally, wherein the one or more performance requirements comprise at least one requirement selected from the group consisting of a capacity requirement, a latency requirement, and a jitter requirement.

Example 54 includes the subject matter of any one of Examples 45-53, and optionally, comprising means for determining one or more weighting coefficients of the weighted function based on one or more power constraints.

Example 55 includes the subject matter of any one of Examples 45-54, and optionally, wherein the one or more performance parameters comprise at least one parameter selected from the group consisting of a channel load of the potential wireless communication channel, an estimated Physical Layer (PHY) rate corresponding to the potential wireless communication channel, a distribution of channel traffic according to Access Category (AC) over the potential wireless communication channel, a relationship between packet length and transmit opportunity duration over the potential wireless communication channel, a collision probability over the potential wireless communication channel, distributions of Received-Signal-Strength over the potential wireless communication channel, and a transmission energy over the potential wireless communication channel.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A wireless communication device comprising:
a channel selector to determine a plurality of channel grades of a respective plurality of potential wireless communication channels, said channel selector to determine a channel grade of said plurality of channel grades according to a weighted function of a plurality of channel assessment parameters corresponding to a potential wireless communication channel of said plurality of potential wireless communication channels, wherein said channel selector is to select, based on said plurality of channel grades, a selected wireless communication channel from said plurality of potential wireless communication channels; and
a radio to communicate over the selected wireless communication channel,
wherein said radio is to communicate with a first wireless network over the selected wireless communication channel, while concurrently communicating with a second wireless network over a network wireless communication channel, the channel selector to assign a predefined grade to a particular channel of said plurality of potential wireless communication channels based on whether or not switching communication with the first wireless network to the particular channel requires a reconnection operation.

2. The wireless communication device of claim 1, wherein said channel selector is to assign a predefined activity-based grade to the potential wireless communication channel based on whether or not the potential wireless communication channel is active in said first wireless network or said second wireless network.

3. The wireless communication device of claim 1, wherein said channel selector is to determine the channel grade of the potential wireless communication channel based on a combination of a first grading value and a second grading value, said first grading value being a result of the weighted function of the plurality of channel assessment parameters corresponding to said potential wireless communication channel, and the second grading value being a result of a weighted function of a plurality of channel assessment parameters corresponding to said network wireless communication channel subject to communication of said first wireless network over said potential wireless communication channel.

4. The wireless communication device of claim 1, wherein said channel selector is to assign one or more predefined highest grades to one or more potential channels, which are active in said first wireless network or said second wireless network.

5. The wireless communication device of claim 1, wherein said channel selector is to assign a predefined lowest grade to the particular channel, if switching the communication with the first wireless network to the particular channel requires the reconnection operation.

6. The wireless communication device of claim 1, wherein said channel selector is to assign a predefined lowest grade to the particular channel, if a capacity of said particular channel does not support a required capacity of said first and second wireless networks.

7. The wireless communication device of claim 1, wherein said wireless communication device is to perform a role of a Peer-to-Peer (P2P) Group Owner (GO) of said first wireless network, and to communicate with an access point of said second wireless network via said network wireless communication channel.

8. The wireless communication device of claim 1, wherein said channel selector is to determine one or more weighting coefficients of said weighted function based on one or more performance requirements corresponding to traffic to be communicated over said selected wireless communication channel.

9. The wireless communication device of claim 8, wherein said one or more performance requirements comprise at least one requirement selected from the group consisting of a capacity requirement, a latency requirement, and a jitter requirement.

10. The wireless communication device of claim 1, wherein said channel selector is to determine one or more weighting coefficients of said weighted function based on one or more power constraints of said wireless communication device.

11. The wireless communication device of claim 2, wherein said plurality of channel assessment parameters comprises at least one parameter selected from the group consisting of a channel load of said potential wireless communication channel, an estimated Physical Layer (PHY) rate corresponding to the potential wireless communication channel, a distribution of channel traffic according to Access Category (AC) over said potential wireless communication channel, a relationship between packet length and transmit opportunity duration over the potential wireless communication channel, a collision probability over the potential wireless communication channel, distributions of Received-Signal-Strength over the potential wireless communication channel, and a transmission energy over the potential wireless communication channel.

12. A wireless communication system comprising:
one or more antennas;
a memory;
a processor;
a channel selector to determine a plurality of channel grades of a respective plurality of potential wireless communication channels, said channel selector to determine a channel grade of said plurality of channel grades according to a weighted function of a plurality of channel assessment parameters corresponding to a potential wireless communication channel of said plurality of potential wireless communication channels, wherein said channel selector is to select, based on said plurality of channel grades, a selected wireless communication channel from said plurality of potential wireless communication channels; and a radio to communicate via said one or more antennas over the selected wireless communication channel, wherein said radio is to communicate with a first wireless network over the selected wireless communication channel, while concurrently communicating with a second wireless network over a network wireless communication channel, the channel selector to assign a predefined grade to a particular channel of said plurality of potential wireless communication channels based on whether or not switching communication with the first wireless network to the particular channel requires a reconnection operation.

13. The wireless communication system of claim 12, wherein said channel selector is to assign one or more predefined highest grades to one or more potential channels, which are active in said first wireless network or said second wireless network.

14. The wireless communication system of claim 12, wherein said channel selector is to determine the channel grade of the potential wireless communication channel based on a combination of a first grading value and a second grading value, said first grading value being a result of the weighted function of the plurality of channel assessment parameters corresponding to said potential wireless communication channel, and the second grading value being a result of a weighted function of a plurality of channel assessment parameters corresponding to said network wireless communication channel subject to communication of said first wireless network over said potential wireless communication channel.

15. The wireless communication system of claim 12, wherein said channel selector is to determine one or more weighting coefficients of said weighted function based on one or more performance requirements corresponding to traffic to be communicated over said selected wireless communication channel.

16. The wireless communication system of claim 12, wherein said channel selector is to determine one or more weighting coefficients of said weighted function based on one or more power constraints.

17. A method of wireless communication, the method comprising:
determining a plurality of channel grades of a respective plurality of potential wireless communication channels, wherein determining said plurality of channel grades comprises determining a channel grade of said plurality of channel grades according to a weighted function of a plurality of channel assessment parameters corresponding to a potential wireless communication channel of said plurality of potential wireless communication channels;
selecting, based on said plurality of channel grades, a selected wireless communication channel from said plurality of potential wireless communication channels; and
communicating over the selected wireless communication channel,
wherein said method comprises communicating with a first wireless network over the selected wireless communication channel, while concurrently communicating with a second wireless network over a network wireless communication channel, and assigning a predefined grade to a particular channel of said plurality of potential wireless communication channels based on whether or not switching communication with the first wireless network to the particular channel requires a reconnection operation.

18. The method of claim 17 comprising assigning a predefined lowest grade to the potential wireless communication channel, if a capacity of said potential wireless communication channel does not support a required capacity of said first and second wireless networks.

19. The method of claim 17 comprising determining the channel grade of the potential wireless communication channel based on a combination of a first grading value and a second grading value, said first grading value being a result of the weighted function of the plurality of channel assessment parameters corresponding to said potential wireless communication channel, and the second grading value being a result of a weighted function of a plurality of channel assessment parameters corresponding to said network wireless communication channel subject to communication of said first wireless network over said potential wireless communication channel.

20. A product including one or more tangible computer-readable non-transitory storage media comprising computer-executable instructions operable to, when executed by at least one processor, enable the at least one processor to cause a wireless communication device to:
determine a plurality of channel grades of a respective plurality of potential wireless communication channels, wherein determining said plurality of channel grades comprises determining a channel grade of said plurality of channel grades according to a weighted function of a plurality of channel assessment parameters corresponding to a potential wireless communication channel of said plurality of potential wireless communication channels;
select, based on said plurality of channel grades, a selected wireless communication channel from said plurality of potential wireless communication channels; and
communicate over the selected wireless communication channel,
wherein said instructions, when executed, cause the wireless communication device to communicate with a first wireless network over the selected wireless communication channel, while concurrently communicating with a second wireless network over a network wireless communication channel, and to assign a predefined grade to a particular channel of said plurality of potential wireless communication channels based on whether or not switching communication with the first wireless network to the particular channel requires a reconnection operation.

21. The product of claim 20, wherein said instructions, when executed, cause the wireless communication device to perform a role of a Peer-to-Peer (P2P) Group Owner (GO) of said first wireless network, and to communicate with an access point of said second wireless network via said network wireless communication channel.

22. The product of claim 20, wherein said instructions, when executed, cause the wireless communication device to determine the channel grade of the potential wireless communication channel based on a combination of a first grading value and a second grading value, said first grading value being a result of the weighted function of the plurality of channel assessment parameters corresponding to said potential wireless communication channel, and the second grading value being a result of a weighted function of a plurality of channel assessment parameters corresponding to said network wireless communication channel subject to communication of said first wireless network over said potential wireless communication channel.

23. The product of claim 20, wherein said instructions, when executed, cause the wireless communication device to determine one or more weighting coefficients of said weighted function based on one or more performance requirements corresponding to traffic to be communicated over said selected wireless communication channel.

24. The product of claim 20, wherein said instructions, when executed, cause the wireless communication device to determine one or more weighting coefficients of said weighted function based on one or more power constraints.

25. The product of claim 20, wherein said plurality of channel assessment parameters comprise at least one parameter selected from the group consisting of a channel load of said potential wireless communication channel, an estimated Physical Layer (PHY) rate corresponding to the potential wireless communication channel, a distribution of channel traffic according to Access Category (AC) over said potential wireless communication channel, a relationship between packet length and transmit opportunity duration over the potential wireless communication channel, a collision probability over the potential wireless communication channel, distributions of Received-Signal-Strength over the potential wireless communication channel, and a transmission energy over the potential wireless communication channel.

* * * * *